United States Statutory Invention Registration [19]

[11] Reg. Number: H11

Basnar et al. [45] Published: Jan. 7, 1986

[54] CAN-OUT HATCH ASSEMBLY AND POSITIONING SYSTEM

[75] Inventors: Paul J. Basnar, Western Springs; Robert C. Frank, Crestwood; Joseph C. Hoh, Naperville, all of Ill.

[73] Assignee: The United States of America as represented by the United States Department of Energy, Washington, D.C.

[21] Appl. No.: 752,416

[22] Filed: Jul. 3, 1985

[51] Int. Cl.[4] ..... B65D 43/14

[52] U.S. Cl. ..... 220/337; 220/200; 220/315; 220/334; 376/272

*Primary Examiner*—Donald P. Walsh

*Attorney, Agent, or Firm*—Hugh W. Glenn; Robert J. Fisher; Judson R. Hightower

[57] ABSTRACT

A can-out hatch assembly is adapted to engage in a sealed manner the upper end of a covered sealed container around an aperture in a sealed chamber and to remove the cover from the container permitting a contaminant to be transferred between the container and the chamber while isolating internal portions of the container and chamber from the surrounding environment. A swing bracket is coupled at a first end thereof to the inner, lower wall of the sealed container adjacent to the aperture therein. To a second end of the swing bracket is mounted a hatch cover which may be positioned in sealed engagement about the chamber's aperture by rotating the hatch cover in a first direction when the swing bracket is in the full down position. Rotation of the hatch cover in a second direction releases it from sealed engagement with the chamber's aperture. A lid support rod also coupled to the second end of the swing bracket and inserted through an aperture in the center of the hatch cover may be rotated for threadably engaging the container's cover whereupon the cover may be removed from the container and the hatch cover displaced from the aperture by pivoting displacement of the swing bracket. The contaminant may then be either removed from the container and placed within the sealed chamber, or vice versa, followed by positioning of the cover upon the container and the hatch cover over the aperture in a sealed manner.

22 Claims, 7 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CAN-OUT HATCH ASSEMBLY AND POSITIONING SYSTEM

CONTRACTUAL ORIGIN OF THE INVENTION

The United States Government has rights in this invention under Contract No. W-31-109-ENG-38 between the U.S. Department of Energy and Argonne National Laboratory.

CROSS REFERENCE TO RELATED APPLICATION

This application is related to but in no way dependent upon the following application which is assigned to the assignee of the present application and filed in the names of Robert C. Frank and Joseph C. Hoh: Serial No. 752415, filed July 3, 1985 and entitled "Can-Out Hatch Assembly With Magnetic Retention Means".

BACKGROUND OF THE INVENTION

This invention relates generally to the handling of contaminants and is particularly directed to an arrangement for transferring a contaminant between a sealed chamber and a closed container while maintaining the contaminant isolated from the environment.

Toxic or radioactive contaminants are typically stored and transported in sealed containers which prevent their escape into the surrounding atmosphere. Government regulations mandate that these containers be structurally sound and leak proof. As a result, the greatest threat of escape of a contaminant into the atmosphere generally occurs during the transfer of the contaminant into or out of the container. During such transfers, it is absolutely essential that the inner, contaminated areas defined by the contaminant-containing vessels be maintained completely and permanently isolated from the outer, clean environment. This not only requires the elimination of leaks from these vessels into the surrounding environment, but also requires that any surfaces exposed to the contaminants or contaminated atmosphere must not be exposed to the surrounding environment. To date, no contaminant transfer arrangement has been able to provide an effective, reliable seal during contaminant transfer while preventing those portions of the transfer mechanism exposed to the contaminant from coming in contact with the surrounding, uncontaminated environment.

The present invention thus represents an improvement over the prior art in that it provides a safe, reliable and inexpensive arrangement for transferring contaminated materials from a covered container to a sealed chamber, or vice versa, while limiting access to the contaminants and contaminated atmosphere only to internal portions of the container and chamber to which the surrounding environment is not exposed.

OBJECTS AND SUMMARY OF THE INVENTION

Accordingly, it is an object of the present invention to maintain a contaminant in isolation while transferring it between sealed containers.

It is another object of the present invention to provide an improved arrangement for transferring a contaminant between sealed containers while preventing exposure of the atmosphere and outer parts of the containers to the contaminant.

Yet another object of the present invention is to provide a safe, reliable means for maintaining a contaminant in isolation while transferring it between closed chambers.

A further object of the present invention is to provide a can-out hatch arrangement particularly adapted for use with a radioactive hot cell having improved sealing and locking characteristics for maintaining a continuous seal around the hot cell during the transfer of radioactive material into or out of the cell.

The present invention contemplates a can-out hatch assembly and positioning system for transferring a contaminant between a sealed chamber and a closed container while maintaining the contaminant isolated from the environment which is particularly adapted for the handling of radioactive materials. The hatch assembly includes an elongated swing bracket pivotally mounted at a first end thereof to an inner wall of the sealed chamber adjacent to an aperture therein through which the contaminant is to be transferred. Secured to a second end of the swing bracket is a hatch cover adapted for positioning over the aperture in a sealed manner and including lid engagement means on a lower portion thereof. Extending through the swing bracket adjacent to the second end thereof and coupled to the hatch cover is a rotatable shaft. The lid engagement means extends downward from the hatch cover and includes a pair of pins adapted for insertion within respective bores in the upper surface of the closed container's lid, or cover. Displacement of the rotatable shaft by means of an actuator arm coupled thereto causes rotation of the hatch cover and the pair of pins extending downward therefrom as well as rotation of the closed container's lid which is thereby released from sealed engagement with the container.

Positioned within the rotatable shaft and extending the length thereof is a lid support rod which is threaded at a first, lower end and is coupled to a control arm at the second, upper end thereof. The lower end of the lid support rod is adapted to engage a complementary threaded bore in the upper surface of the container's lid whereby the lid may be removed from the container by pivoting displacement of the swing bracket away from the chamber's aperture. The contaminant may then be moved between the chamber and the container without exposure to the surrounding environment while the lower portion of the hatch cover, which includes the lid engagement means and is exposed to the environment following removal of the container, is shielded from the contaminant by the container's lid. Both the actuator arm and control arm may be manipulated by remote means within the sealed chamber and the contaminant may be transferred by means of a remote manipulator. The closed container may be displaced and positioned over the sealed chamber's aperture by means of an automatic positioning system.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DESCRIPTION OF THE PREFERRED EMBODIMENT

Figure 1:
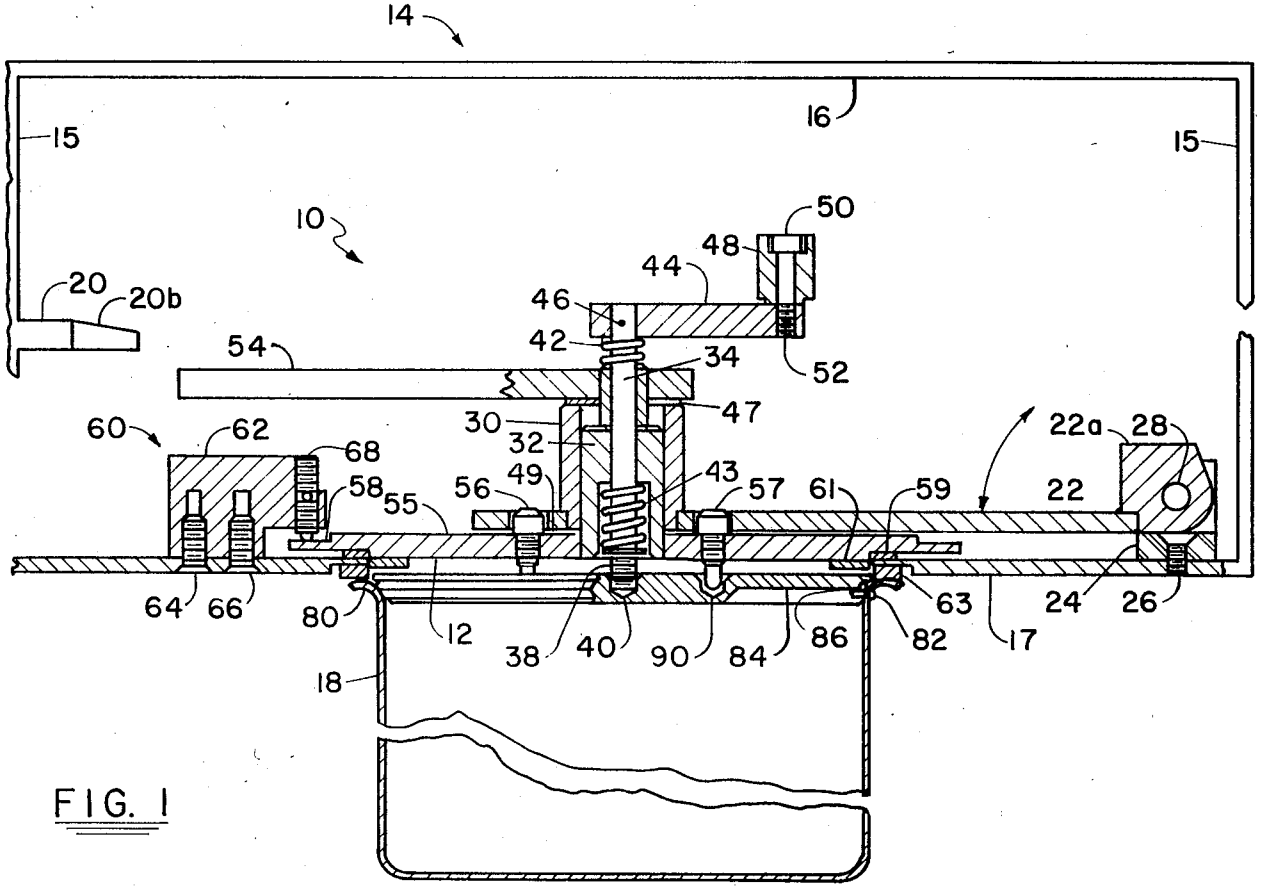
FIG. 1 is a partially cutaway side view of a can-out hatch assembly for use with a sealed chamber and a covered container in accordance with the present invention.
Figure 2A:
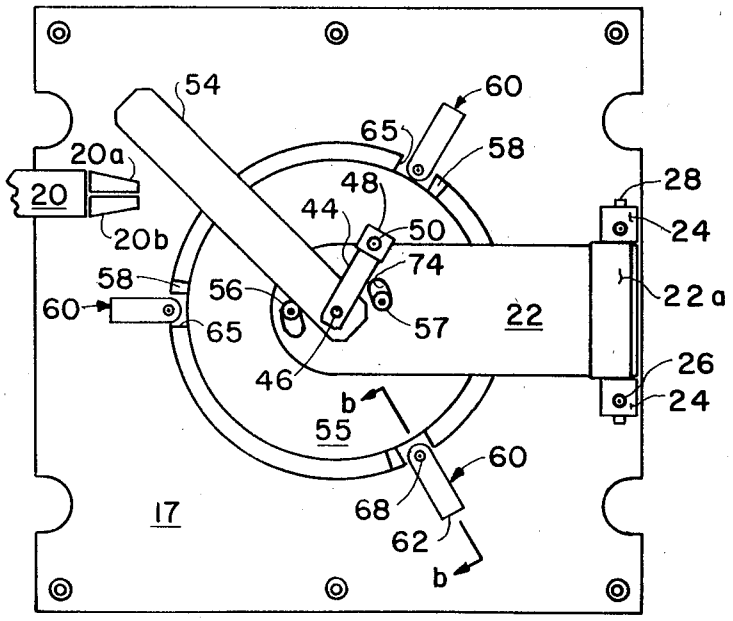
FIGS. 2*a* and 2*b* are a plan and a fragmentary sectional view of the can-out hatch assembly of FIG. 1.
Figure 2B:
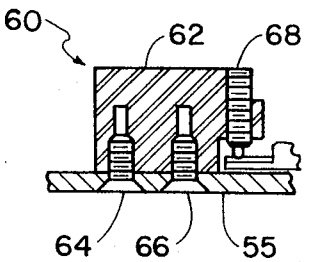

Referring to FIGS. 1 and 2, there are respectively shown a partially cutaway lateral view and a plan view of a can-out hatch assembly 10 in accordance with the present invention for use with a sealed chamber 14 and a covered container 18. The sealed container 14 includes a plurality of lateral panels, or walls, 15, an upper panel 16 and a bottom panel 17. The bottom panel 17 includes an aperture 12 therein which is sealed by means of the can-out hatch assembly 10 of the present invention as described below.

A remote controller 20 extends through a lateral panel 15 and into the sealed chamber 14 for manipulating the can-out hatch assembly 10 as described below. The remote controller 20 is shown in simplified diagrammatic form in the figures and would typically include a pair of movable pincer elements 20*a*, 20*b* for grasping and manipulating the can-out assembly. The remote controller 20 is typically subject to control inputs provided by a user outside of the sealed chamber 14 and is capable of extension and retraction as well as elevational and lateral displacement within the sealed chamber to permit it to engage the can-out hatch assembly 10 and exercise control over its operation. The remote controller 20 may also be used to transfer a contaminant (not shown) between the sealed chamber 14 and the container 18.

Briefly, under the control of the remote controller 20, the can-out hatch assembly 10 is capable of engaging the cover, or lid, 84 of the container 18 when the container is positioned immediately adjacent to and aligned with the aperture 12 within the bottom panel 17 of the sealed chamber 14. The can-out hatch assembly 10 engages and removes the cover 84 from the container 18 and displaces it away from the aperture 12 within the sealed chamber 14 to permit a contaminant to be transferred from the sealed chamber 14 to the container 18, or vice versa, while shielding the lower portion of the can-out hatch assembly 10 from the contaminated environment within the sealed chamber 14. Once the transfer is completed, the cover 84 is again positioned in sealed relation upon the container 18 by means of the can-out hatch assembly 10 which is again positioned in sealed relation about the aperture 12 within the sealed chamber 14. The covered container 18 with the contaminant sealed therein may then be removed from the sealed chamber 14, with the exposed lower surface of the can-out hatch assembly 10, which had been shielded from the contaminated environment within the sealed chamber, providing a "clean" surface to the surrounding environment. The can-out hatch assembly 10 of the present invention thus provides for the sealed transfer of a contaminant between a sealed chamber and a covered container and ensures that no components or surfaces of the contaminant transfer arrangement exposed to the contaminant are later positioned in contact with the surrounding environment. The details of the manner in which this is accomplished by the can-out hatch assembly of the present invention are provided in the following paragraphs.

The can-out hatch assembly 10 includes an elongated swing bracket, or pivot arm, 22 pivotally coupled to the bottom panel 17 of the sealed chamber 14 by means of the combination of a hinge base, or pivot bracket, 24 and a hinge shaft, or pivot pin, 28. The pivot end 22*a* of the swing bracket 22 is pivotally coupled to the hinge base 24 by means of the pivot pin 28. The hinge base 24 is securely mounted to the upper surface of the bottom panel 17 of the sealed chamber 14 by means of a mounting screw 26. As shown in FIG. 2, a hinge base 24 is positioned immediately adjacent to the pivot end 22*a* of the swing bracket 22, with the pivot end 22*a* adapted to engage the pivot pin 28 substantially along the entire length thereof. The swing bracket 22 is thus adapted for rotational displacement about the pivot pin 28 to allow for the raising and lowering of the swing bracket 22 within the sealed chamber 14.

The second end of the swing bracket 22 is provided with first and second rotational displacement limiting apertures 72, 74 and yet another aperture within which is positioned a generally cylindrical hub 30. The hub 30 extends upward from the swing bracket 22 and is oriented generally 90° with respect thereto. The hub 30 and the swing bracket 22 may be coupled by conventional means such as by welding.

Positioned within the hub 30 and free to rotate therein is a shaft 32. The shaft 32 is coupled at its upper end to a generally horizontally oriented actuating arm 54 and at its lower end to a generally planar hatch plate 55. The rotatable shaft 32 may be coupled to the actuating arm 54 and hatch plate 55 by conventional means such as welding, coupling pins, etc. Positioned within the rotatable shaft 32 and, in turn, free to rotate therein is lid support rod 34. The lid support rod 34 includes a threaded portion 38 at the lower end thereof adapted to engage a threaded bore 40 in the upper surface of the container's cover 84. The upper end of the rotatable lid support rod 34 is coupled to a control arm 44 by means of a roll pin 46. A control knob 48 is mounted to the distal end of the control arm 44 by means of a shoulder screw 50 which is maintained in place by a roll pin 52. A thrust washer 47 is positioned around the upper end portion of the rotatable shaft 32 and is interposed between the actuating arm 54 and hub 30 to facilitate relative rotation therebetween. In addition, a washer 49 is positioned between the swing bracket 22 and the hatch plate 55 to facilitate rotational displacement therebetween. This configuration of components permits the hatch plate 55 to be rotationally displaced by engaging and displacing the actuating arm 54. Similarly, the lid support rod 34 including the threaded lower end portion 38 thereof may be rotationally displaced by displacement of the combination of the control arm 44 and control knob 48. As stated above, the control knob 48 and actuating arm 54 are adapted for engagement and rotational displacement by the remote controller 20.

A first spring 42 is positioned about an upper end portion of the lid support rod 34 and between the control arm 44 and the rotatable shaft 32. Similarly, a second spring 43 is positioned around the lid support rod 34 and between the rotatable shaft 32 and a retaining ring 36 located on a lower portion of the lid support rod. The first spring 42 biases the lid support rod 34 upward while the second spring 43 biases the lid support rod downward and, in combination, maintain the lid support rod firmly positioned within the hub 30 and adapted for engaging the cover 84 of the container as described below.

Positioned around the periphery of the hatch plate 55 are a plurality of slots 65. Located in the periphery of the hatch plate 55 immediately adjacent to each of the slots 65 is a camming surface 58 which is inclined relative to the generally flat upper surface of the hatch plate. Securely mounted to the upper surface of the bottom panel 17 of the sealed chamber and positioned around the periphery of the hatch plate 55 in spaced relation are a plurality of locking assemblies 60. Each of the locking assemblies 60 is positioned around the periphery of the hatch plate 55 so as to coincide with a respective slot 65 therein. Each locking assembly 60 includes a lock down bracket 62 secured to the bottom panel 17 of the sealed chamber by means of mounting screws 64 and 66. Securely coupled to each of the lock down brackets 62 is a threaded lock down pin 68 which extends through and below a lower portion of the lock down bracket 62. The lower end portion of each of the lock down pins 68 is adapted to engage a respective camming surface 58 of the hatch plate 55 when the hatch plate is rotated in a counterclockwise direction as shown in FIG. 2. This provides for the downward displacement of the hatch plate 55 and its secure engagement with the bottom panel 17 of the sealed chamber. Rotational displacement of the hatch plate 55 is accomplished by rotating the actuating arm 54 which is coupled to the hatch plate 55 by means of the rotatable shaft 32. For illustration purposes, hatch plate 55 is shown in the downward locked position in FIG. 1 but in the unlocked position in FIG. 2.

First and second limit pins 56, 57 are threadably positioned within a respective aperture within the hatch plate 55. In addition, the upper end portions of the first and second limit pins 56, 57 are positioned within first and second rotational displacement limiting apertures 72, 74, respectively, within the swing bracket 22. The combination of the aforementioned limiting pins 56, 57 and limiting apertures 72, 74 serves to limit the rotational displacement of the hatch plate 55 relative to the swing bracket 22. With a respective limit pin 56, 57 positioned at one end of a rotational displacement limiting aperture 72, 74, the hatch plate 55 is positioned in the full down position and in sealed engagement with the bottom panel 17 of the sealed chamber. Similarly, with each of the limit pins positioned at the other end of a respective limiting aperture, the hatch plate 55 is disengaged from the bottom panel 17 and also from each of the locking assemblies 60 allowing the hatch plate to be pivotally displaced above the bottom panel and away from the aperture 12 therein by means of the swing bracket 22. It is in this manner that by rotational displacement of the hatch assembly 55 by means of the actuating arm 54, the hatch plate may be locked in sealed engagement with the bottom panel 17 of the sealed chamber and may also be released therefrom to permit the hatch plate to be removed from the aperture 12 in the sealed chamber to permit transfer of a contaminant into or out of the sealed chamber.

A compressible outer gasket, or O-ring, 59 is positioned on the lower, peripheral surface of the hatch plate 55 for engagement with the bottom panel 17 to provide sealed contact therebetween. Similarly, a compressible inner gasket, or O-ring, 61 is also positioned on the lower surface of the hatch plate 55 for effecting sealed engagement between the hatch plate and the container cover, or lid, 84 as described below.

Figure 3:
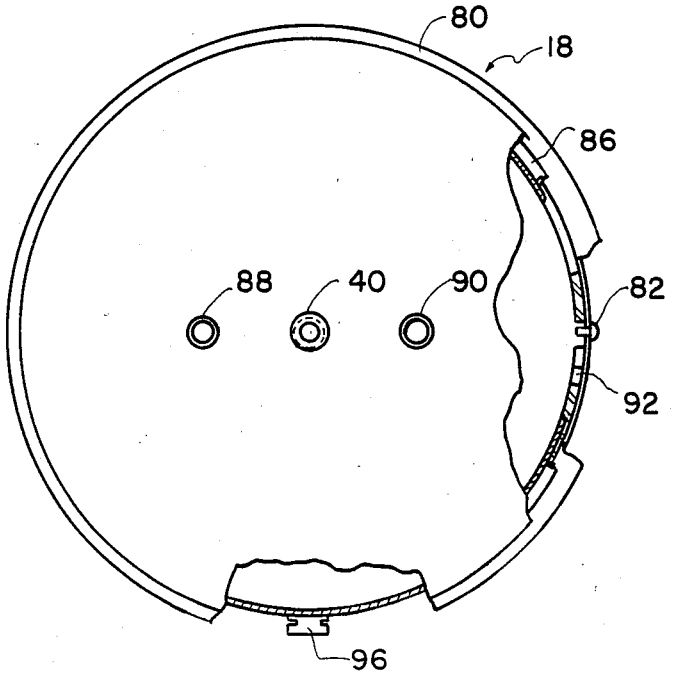
FIG. 3 is a partially cutaway plan view of a container with a cover for use with the can-out hatch assembly of the present invention.
Figure 4:
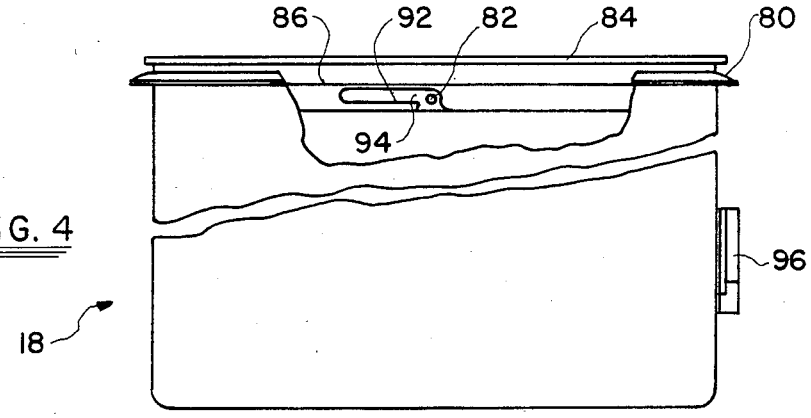
FIG. 4 is a partially cutaway lateral view of the covered container of FIG. 3.

Referring to FIGS. 3 and 4, there are respectively shown partially cutaway plan and side views of a container 18 having a cover, or lid, 84 thereon. Each of the first and second limit pins 56, 57 extends below the lower surface of the hatch plate 55 and is adapted for insertion within a respective bore 88, 90 within the upper surface of the container's cover 84. In addition, a threaded bore 40 in the center of the top surface of the container's cover 84 is adapted to receive and engage the threaded lower end portion 38 of the rotatable lid support rod 34. Positioned around the periphery of the container's cover 84 is an O-ring 86 which is adapted to engage in a sealed manner the inner surface of the container 18 when the cover is positioned tightly thereon. Positioned around the periphery of and inserted through the lateral surface of the container 18 are a plurality of locking pins 82. The outer periphery of the cover 84 is similarly provided with a plurality of generally L-shaped locking notches 94 which are spaced around the periphery of the container's cover similar to the spaced arrangement of the locking pins 82 around the container itself. Each locking notch 94 is adapted to receive a respective locking pin 82 when displaced downward upon the upper edge of the container 18 and includes a sealing rib 92. Rotation of the container's cover 84 in the direction of the arrow shown in FIG. 4 results in engagement of the locking pin 82 with the sealing rib 92 whereupon the cover 84 is locked in sealed engagement with the container 18. Rotation of the cover 84 in the opposite direction unlocks the cover and permits it to be removed from the container 18.

Installation and removal of the cover 84 on the container 18 by the can-out hatch assembly 10 is accomplished in the following manner. Before the container 18 is placed in position adjacent to the aperture 12 within the bottom panel 17 of the sealed chamber 14, the hatch plate 55 is positioned in sealed engagement with the sealed chamber's bottom panel as shown in FIG. 1. The container 18 is then positioned in sealed engagement with the lower gasket 63 on the lower surface of the bottom panel 17 immediately adjacent to and around the aperture 12 therein as shown in FIG. 1. With the container 18 thus positioned in engaging contact with the lower gasket 63 on the bottom panel 17, the threaded bore 40 in the center of the cover 84 is aligned with the threaded lower end portion 38 of the rotatable lid support rod 34. Similarly, the first limit pin 56 is inserted in the first bore 88 and the second limit pin 57 is inserted in the second bore 90 in the upper surface of the container's cover 84. Sealed engagement between the cover 84 and the container 18 is maintained by the O-ring 86.

Rotation of the lid support rod 34 results in engagement between the threaded lower end portion 38 thereof and the threaded bore 40. Rotation of the lid support rod 34 causes the upward displacement of the cover 84, the upper peripheral surface of which is then engaged by the inner gasket 61. The lower surface of the hatch plate 55 is thus isolated from the contaminant within the container 18 when the cover 84 is removed therefrom. Rotation of the actuating arm 54 causes the rotation of the hatch plate 55 and first and second limit pins 56, 57 coupled thereto and results in the rotational displacement of the cover 84. When the cover 84 is rotated in a direction generally opposite to the direction of the arrow shown in FIG. 4, each of the locking pins 82 becomes disengaged from a respective sealing rib 92. Rotation of the actuating arm 54 similarly unlocks the hatch plate 55 from engagement with the bottom panel 17 of the sealed chamber 14 as previously described. With the cover 84 thus unlocked from the container 18 and engaged by the threaded lower end portion 38 of the lid support rod 34 and the hatch plate 55 thus unlocked from the bottom panel 17, the actuating arm 54 may be engaged by the remote controller 20 and displaced upward to allow the pivoting displacement of the swing bracket 22 about the pivot pin 28. The hatch plate 55 as well as the container's cover 84 may thus be removed from the aperture 12 within the bottom panel 17 and the contaminant may either be removed from the sealed chamber 14 and placed in the container 18 or vice versa.

Once the contaminant is thus transferred, the combination of the hatch plate 55 and cover 84 is again positioned within the aperture 12 of the bottom panel 17. The hatch plate 55 may then be locked in position against the bottom panel 17 and the cover 84 may be locked in sealed engagement with the container 18 by rotating the actuating arm 54. With the hatch plate 55 positioned in sealed engagement with the bottom panel 17 of the sealed chamber 14 and the cover 84 securely positioned upon the upper edge portion of the container 18, the lid support rod 34 may then be rotated by means of the control knob 48 to permit disengagement of the lower threaded portion 38 of the lid support rod from the threaded center bore 40 in the upper surface of the container's cover 84. The sealed container 84 may then be removed from engagement with the lower surface of the bottom panel 17 with the hatch plate 55 remaining in sealed engagement about the aperture 12 within the bottom panel of the sealed chamber 14.

Figure 5:
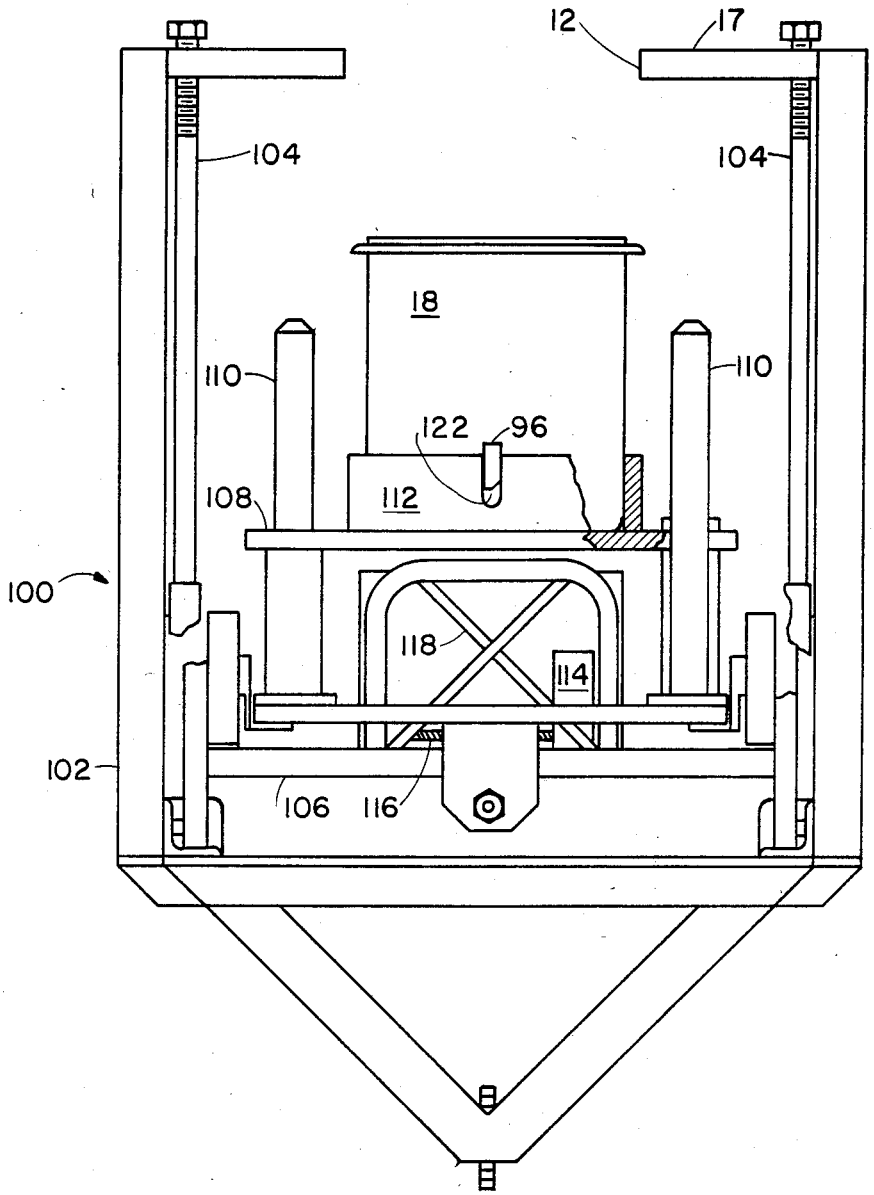
FIG. 5 is a lateral view of a container positioning assembly for use with the can-out hatch assembly of the present invention.
Figure 6:
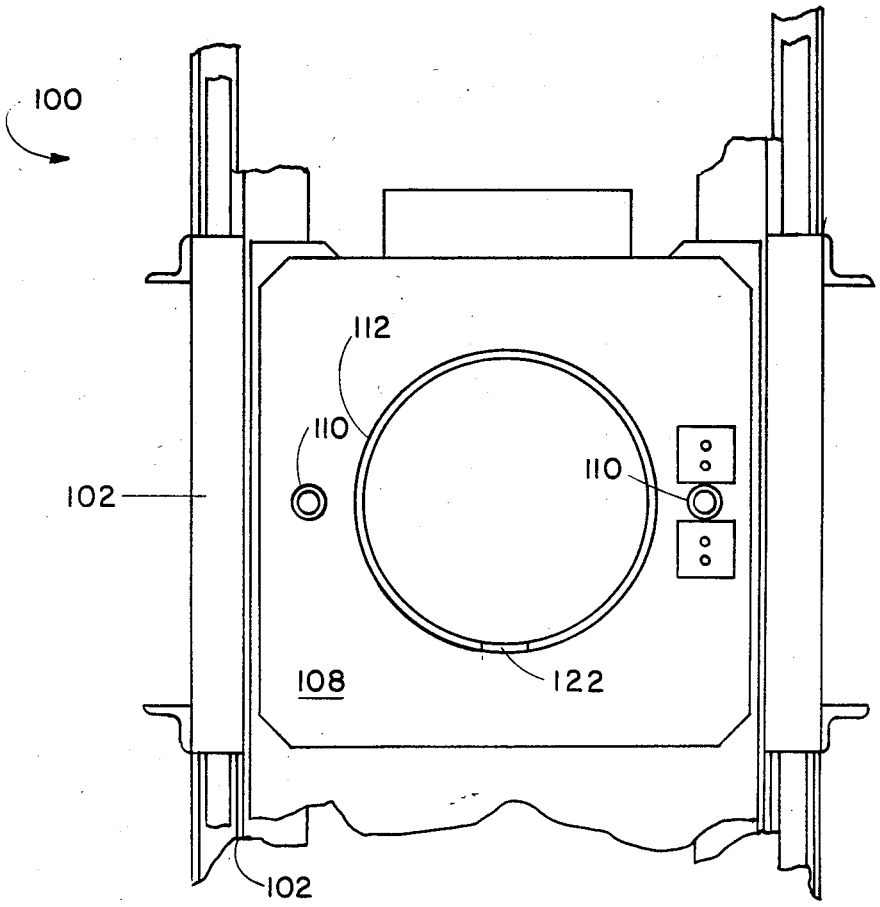
FIG. 6 is a plan view of the container positioning assembly of FIG. 5.

Referring to FIGS. 5 and 6, there are respectively shown lateral and top plan views of a container positioning assembly 100 for use in positioning the container 18 around the aperture 12 in the chamber's bottom panel 17 and in sealed engagement therewith. The container positioning assembly 100 includes a frame 102 coupled by means of mounting bolts 104 to the bottom panel 17 of the sealed chamber and suspended therefrom. A lower portion of the frame 102 includes a generally horizontally aligned base 106. Mounted upon the base and extending generally vertically upward therefrom are a pair of alignment rods 110. Also positioned upon the base 106 of the frame is the combination of an electric motor 114 and a scissors frame 118. The electric motor 114 is coupled to the scissors frame 118 by means of a threaded shaft 116 such that rotation of the shaft in one direction causes the upward extension of the scissors frame, while rotation of the threaded shaft in the opposite direction results in the retraction, or downward displacement, of the scissors frame. Coupled to an upper portion of the scissors frame 118 and aligned with the alignment rods 110 is a support platform 108. The support platform 108 is free to move vertically along the alignment rods 110 and is supported by the scissors frame 118. Positioned on an upper surface of the support platform 108 is a generally circular alignment ring, or rim, 112. The covered container 18 is positioned within the alignment ring 112 which is positioned within the container positioning assembly 110 such that upward displacement of the support frame 108 positions the upper end of the covered container 18 in tight fitting relation with the bottom panel 17 of the sealed chamber and about the aperture 12 therein.

The alignment ring 112 includes an alignment slot 122 therein which is adapted to receive an alignment bracket 96 positioned on the lateral, outer surface of the covered container 18. The alignment bracket 96, which is shown in greater detail in FIGS. 3 and 4, is positioned by the alignment ring 112 for maintaining proper alignment between the covered container 18 and the sealed chamber 14. By thus maintaining proper alignment between the sealed chamber 14 and the covered container 18, the bores 88, 90 within the upper surface of the container's cover 84 are maintained properly aligned with the first and second limit pins 56, 57 within the hatch plate 55. Thus, when the covered container 18 is positioned over the aperture 12 in the bottom panel 17 of the sealed chamber, the container's cover 84 will be positioned and oriented to permit the can-out hatch assembly of the present invention to engage, rotate, and remove the cover from the container as described above.

As shown in FIG. 6, the container positioning assembly 100 may be part of a conveyor system 120 which displaces the sealed containers to a position immediately beneath the aperture within the sealed chamber for effecting the transfer of contaminants therebetween. The combination of the conveyor system 120 and the container positioning assembly 100 affords fully automatic transport and positioning of the covered containers for improved reliability and safety in the transfer of contaminants.

There has thus been shown a can-out hatch assembly and positioning system for facilitating the transfer of a contaminant between a sealed chamber and a covered container which allows for removal of the container's cover while maintaining sealed engagement between the container and the sealed chamber about an aperture therein. The exterior portion of the hatch assembly is covered by the container's lid and thus shielded from the contaminant during its transfer. Therefore, when the hatch assembly is again positioned over the chamer's aperture, the chamber is again sealed with respect to the surrounding environment and the exterior surface of the hatch assembly remains "clean", not having been exposed to the contaminant during its transfer. Provision is made for remote operation of the hatch assembly as well as for the automatic transport and positioning of the covered container in alignment with the aperture within the sealed chamber.

While particular embodiments of the present invention have been shown and described, it will be obvious to those skilled in the art that changes and modifications may be made without departing from the invention in its broader aspects. For example, while one specific arrangement for engagement of the container's cover by the can-out hatch assembly has been shown and described in detail, a large variety of coupling arrangements, some of which would not require alignment between the container's cover and the hatch assembly and which are conventional in design and operation, would be available to and are known by those skilled in the art. In addition, other forms of remote control means other than a mechanical arm such as shown and described herein could be used for manipulating the can-out hatch assembly of the present invention. Many such control systems, such as of the pneumatic or hydraulic type, could be utilized in the present invention and are conventional in design and operation and thus could be easily integrated for use in the present invention by those skilled in the relevant arts. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. A hatch assembly for sealing an aperture within a wall of a sealed chamber in a first closed position while permitting the transfer of a contaminant between said chamber and a container positioned in sealed engagement with said wall around the aperture therein in a second open position, said container having a cover positioned in sealed engagement thereon, said hatch assembly comprising:

an elongated member pivotally mounted at a first end thereof to an inner surface of the sealed chamber's wall and having a second end positioned over the aperture in the wall when said elongated member is in a first lowered position;

rotational displacement means coupled to said elongated member adjacent to the second end thereof;

a generally planar member coupled and responsive to said rotational displacement means and positioned over the aperture in the wall when said elongated member is in said first lowered position, wherein said planar member may be rotationally displaced by said rotational displacement means;

locking means mounted to the inner surface of the wall for locking said planar member in sealed engagement with the wall about the aperture therein when said planar member is rotated in a first direction and for releasing said planar member from the wall when said planar member is rotated in a second direction by said rotational displacement means;

connecting means mounted to said elongated member adjacent to the second end thereof for coupling said elongated member to the cover of the container when the container is positioned in sealed engagement with the wall around the aperture therein; and engaging means coupled to said planar member and rotationally displaced therewith by said rotational displacement means for engaging the cover of the container when positioned in sealed engagement with the wall around the aperture therein, wherein rotation of said engaging means in said first direction locks the cover in sealed engagement with the container and rotation of said engaging means in a second direction disengages the cover from the container permitting the cover to be removed from the container by said connecting means when said elongated member is pivotally moved to a second upraised position and wherein the cover is positioned over the lower surface of said planar member in shielding said planar member's lower surface from exposure to the contaminant.

2. A hatch assembly in accordance with claim 1 further comprising, in combination, a pivot pin and a pivot bracket coupling the first end of said elongated member to an inner surface of the sealed chamber's wall.

3. A hatch assembly in accordance with claim 1 further comprising remote control means within the sealed chamber for displacing said elongated member between the first lowered position and the second upraised position.

4. A hatch assembly in accordance with claim 1 wherein the second end of said elongated member includes an aperture wherein are positioned said rotational displacement means and said connecting means.

5. A hatch assembly in accordance with claim 4 wherein the container's cover includes a threaded bore in an upper surface thereof and wherein said connecting means includes a rotatable shaft having a threaded lower end portion for threadably engaging the cover.

6. A hatch assembly in accordance with claim 5 wherein the upper surface of the container's cover is generally circular in cross-section and said threaded bore is positioned generally in the center of the upper surface of the cover.

7. A hatch assembly in accordance with claim 6 further including a control arm coupled to an upper end portion of said rotatable shaft to facilitate the rotational displacement thereof.

8. A hatch assembly in accordance with claim 7 further comprising first biasing means coupled to said rotatable shaft for urging the lower threaded end portion thereof in an upward direction when the cover is disengaged from the container by said engaging means.

9. A hatch assembly in accordance with claim 8 further comprising second biasing means coupled to said rotatable shaft for urging the lower threaded end portion thereof in a downward direction when the cover is positioned in sealed engagement with the container to facilitate engagement of the lower threaded end portion of said rotatable shaft with said threaded bore in the cover.

10. A hatch assembly in accordance with claim 9 wherein said first and second biasing means each include a coiled spring positioned on said rotatable shaft along a portion of the length thereof.

11. A hatch assembly in accordance with claim 1 wherein the second end of said elongated member includes an aperture therein and said rotational displacement means includes a generally vertical shaft positioned within the aperture of said elongated member.

12. A hatch assembly in accordance with claim 11 further including an actuating arm coupled to an upper end portion of said vertical shaft to facilitate the rotation thereof.

13. A hatch assembly in accordance with claim 1 further including rotation limiting means coupled between said elongated member and said planar member for limiting the rotational displacement of said planar member between first and second positions, wherein said planar member is in sealed engagement with the chamber's wall when in said first position and is disengaged from the chamber's wall in said second position.

14. A hatch assembly in accordance with claim 13 wherein said elongated member includes a pair of slots therein and said rotation limiting means includes first and second pins coupled to said planar member and positioned within a respective slot in said elongated member and wherein the ends of said slots define the limits of the rotational displacement of said planar member.

15. A hatch assembly in accordance with claim 14 wherein said engaging means includes a pair of spaced bores on an upper surface of the container's cover and respective lower end portions of the first and second pins which are adapted for insertion within a respective spaced bore to facilitate rotation of the cover by said rotational displacement means.

16. A hatch assembly in accordance with claim 1 further including a compressible seal positioned between said planar member and the chamber's wall around the aperture therein.

17. A hatch assembly in accordance with claim 1 further including a compressible seal positioned between said planar member and the container cover around the periphery thereof.

18. A hatch assembly in accordance with claim 1 further including a compressible seal positioned between an upper edge portion of the container and a lower surface of the chamber's wall around the aperture therein.

19. A hatch assembly in accordance with claim 1 wherein said planar member is generally circular and includes a plurality of paired slots and adjacent cam surfaces around the periphery thereof and wherein said locking means includes a plurality of brackets spaced around the periphery of said planar member and mounted to the inner surface of the wall and adapted to engage a respective cam surface when said planar member is rotated in said first direction.

20. A hatch assembly in accordance with claim 1 further including positioning means for maintaining the container in sealed engagement with the wall around the aperture therein during the transfer of the contaminant between the chamber and the container and for aligning the container with said hatch assembly to facilitate engagement of the container's cover by said engagement means.

21. A hatch assembly in accordance with claim 20 wherein said positioning means includes an alignment bracket positioned on an outer surface of the container and a receptacle for receiving the container, wherein said receptacle includes a notch in a lateral portion thereof for receiving said alignment bracket.

22. A hatch assembly in accordance with claim 21 further including conveyor means for translationally displacing the container to a position immediately beneath the aperture within the chamber's wall.

* * * * *